US006751575B2

(12) United States Patent
Lenz et al.

(10) Patent No.: US 6,751,575 B2
(45) Date of Patent: Jun. 15, 2004

(54) SYSTEM AND METHOD FOR MONITORING AND CONTROL OF PROCESSES AND MACHINES

(75) Inventors: Gary A. Lenz, Eden Prairie, MN (US); David B. Wheeler, Austin, TX (US)

(73) Assignee: Infoglide Corporation, Austin, TX (US)

( * ) Notice: Subject to any disclaimer, the term of this patent is extended or adjusted under 35 U.S.C. 154(b) by 571 days.

(21) Appl. No.: 09/783,707

(22) Filed: Feb. 14, 2001

(65) Prior Publication Data

US 2001/0032025 A1 Oct. 18, 2001

Related U.S. Application Data (60) Provisional application No. 60/182,247, filed on Feb. 14, 2000.

(51) Int. Cl.[7] .......................... G06F 19/00; G05B 13/00
(52) U.S. Cl. .......................... 702/182; 700/51; 700/52; 702/179
(58) Field of Search ................................. 702/182, 179, 702/181; 700/28, 29, 30, 32, 51, 52

(56) References Cited

U.S. PATENT DOCUMENTS

| | | | | |
|---|---|---|---|---|
| 5,067,099 A | * | 11/1991 | McCown et al. | ........... 702/183 |
| 5,850,339 A | * | 12/1998 | Giles | .......................... 700/52 |
| 5,862,054 A | * | 1/1999 | Li | ............................... 700/121 |
| 6,181,975 B1 | * | 1/2001 | Gross et al. | .................. 700/29 |
| 2002/0087290 A1 | * | 7/2002 | Wegerich et al. | ........... 702/182 |
| 2002/0128731 A1 | * | 9/2002 | Wegerich et al. | ............. 700/31 |
| 2002/0183971 A1 | * | 12/2002 | Wegerich et al. | ........... 702/185 |
| 2003/0109951 A1 | * | 6/2003 | Hsiung et al. | .............. 700/108 |
| 2003/0144746 A1 | * | 7/2003 | Hsiung et al. | ................ 700/28 |

OTHER PUBLICATIONS

Chen et al., "SRDE—Application of Data Similarity to Process Control", Dec. 1, 1999.*

* cited by examiner

*Primary Examiner*—Patrick J Assouad
(74) *Attorney, Agent, or Firm*—Taylor Russell & Russell, P.C.

(57) ABSTRACT

The disclosed invention includes a system and method for monitoring and control of processes and machines. A computer-implemented method for monitoring and controlling a process comprises storing process attribute information of objects in a plurality of databases, receiving at least one process measurement from a measurement device, similarity searching the at least one process measurement against the process attribute information stored in the databases, assigning a similarity score to the process measurement, comparing the similarity score to a match tolerance level, computing a process action for at least one process machine, via an algorithm having a process variable, replacing the process variable in the algorithm with the process measurement where the similarity score is equal to or greater than the match tolerance level, replacing the process variable in the algorithm with a set point where the similarity score is lower than the match tolerance level, and communicating the process action to a process machine.

39 Claims, 7 Drawing Sheets

PRIOR ART

FIG. 7

SYSTEM AND METHOD FOR MONITORING AND CONTROL OF PROCESSES AND MACHINES

REFERENCE TO RELATED APPLICATION

This application claims the benefit of U.S. Provisional Application No. 60/182,247 filed Feb. 14, 2000.

BACKGROUND

The invention relates to a system and method for monitoring, controlling, and diagnosing process machines. Particularly, the invention relates to a system of data mining and comparison, using a similarity search engine to identify the degree of similarity between process-related objects and a process control machine.

The process and factory automation industry is well-known for its control of processes that are common among such facilities as plants, refineries, power generation, water and waste management, food and beverage production, etc. Control of these processes may comprise a multiplicity of process control loops that control process pressures, flows, temperatures, levels, alkalinity and acidity, composition, packaging, positions, and the like. A control system may comprise a single-loop system, multi-loop system, Digital Control System (DCS), Programmable Logic Controller (PLC), Supervisory Control and Data Acquisition (SCADA) system, or even a simple data acquisition system used for strictly monitoring a process.

Accurate control of a process is predicated on obtaining accurate information from a sensor or transmitter. These devices may fail or drift, resulting in false or inaccurate readings being posted to the controller. In these cases, the controller is unable to issue control actions to the control device to achieve the desired set point. Thus, there is a need for a control system that can determine whether false or inaccurate readings are being given, can monitor a process machine's performance and health, and can diagnose problems with process machines.

SUMMARY

The current invention provides a method of data mining for monitoring and controlling a process via a process controller, comprising the steps of collecting and storing process attribute information in a plurality of databases, receiving at least one process measurement from a measurement device, similarity searching the at least one process measurement against the process attribute information stored in the databases, assigning a similarity score to the process measurement, and comparing the similarity score to a match tolerance level. The invention further includes computing a process action for at least one process machine, via an algorithm having a process variable, which comprises replacing the process variable in the algorithm with the process measurement where the similarity score is equal to or greater than the match tolerance level, and replacing the process variable in the algorithm with a set point where the similarity score is lower than the match tolerance level. The process action is then communicated to a process machine.

The process attribute information may comprise the process impact of at least one process machine, process machine performance ranges, process machine conditions, process set points, past process measurements, and any combination of these. The at least one database may reside on a process controller, or may communicate with a process controller, via a network. The network may consist of local area networks, wide area networks, global communication networks, intranet, and Ethernet. The measurement device from which the process measurement is received may comprise a process sensor. The process measurement may be received from the measurement device, via an input/output device.

The step of similarity searching may be performed via a similarity search engine, which may reside on a process controller or communicate with the process controller via a network. This network may be chosen from a group consisting of local area networks, wide area networks, global communication networks, intranet, and Ethernet. The similarity search score may be assigned via a process controller. The process action may be computed via a process controller, and the process action is communicated via a process controller. The current invention is also directed to a software program embodied on a computer-readable medium incorporating the invented method.

In another embodiment of the present invention, a computer-implemented method for monitoring and controlling a process comprises collecting and storing process attribute information in a plurality of databases, receiving at least one process measurement from a measurement device onto a process controller via an input/output device, similarity searching the at least one process measurement against the process attribute information stored in the databases via a similarity search engine, assigning a similarity score to the process measurement via the process controller, comparing the similarity score to a match tolerance level, the process controller computing a process action for at least one process machine via an algorithm having a process variable comprising replacing the process variable in the algorithm with the process measurement where the similarity score is equal to or greater than the match tolerance level, replacing the process variable in the algorithm with a set point where the similarity score is lower than the match tolerance level, and the process controller communicating the process action to a process machine via an input/output device.

In another embodiment of the current invention, a system for monitoring and controlling a process comprises a plurality of databases for storing process attribute information, a means for receiving a process measurement from a measurement device, a similarity search engine for similarity searching the measurement against the process attribute information stored in the databases, a means for assigning a similarity search score to the measurement, a means for comparing the similarity search score to a match tolerance level, a process controller for computing a process action, and a means for communicating the process action to a process machine.

In another embodiment of the current invention, a method for identifying an unidentified object having at least one process attribute comprises collecting information about at least one process attribute of the unidentified object, converting the collected attribute information into a language independent format, arranging the collected information in language independent format in a predetermined sequence, comparing the language independent collected attribute information with information related to a plurality of known objects, wherein the known objects may include a different number and type of attributes than the unidentified object, assigning a value to each of the known objects that indicate the degree of similarity each known object has to the unidentified object, providing a list of known objects most closely matching the unknown object based on the assigned similarity values, and replacing the attribute of the unidentified object with the known object of highest similarity.

In another embodiment of the present invention, a method of data mining objects having attributes for one or more process control loops comprises collecting information about at least one process attribute from a process variable database, converting the collected attribute information into a language independent format, arranging the language independent collected information in a predetermined sequence, comparing the language independent collected attribute information with information related to a plurality of known objects, wherein the known objects may include different numbers and types of attributes than the collected process attribute information, assigning a similarity value to each of the known objects for indicating the degree of similarity each object has to the collected process variable attribute, and providing a list of the known objects that most closely match the object having the collected attribute based on the similarity value.

The similarity searching method used in accordance with the present invention may comprise any suitable similarity searching method or technique. The method may comprise the similarity search method in U.S. Pat. No. 5,666,442 by Wheeler, which is incorporated by reference herein.

BRIEF DESCRIPTION OF THE DRAWINGS

These and other features, aspects, and advantages of the present invention will become understood with regard to the following description, appended claims, and accompanying drawings where:

DETAILED DESCRIPTION

Figure 1:
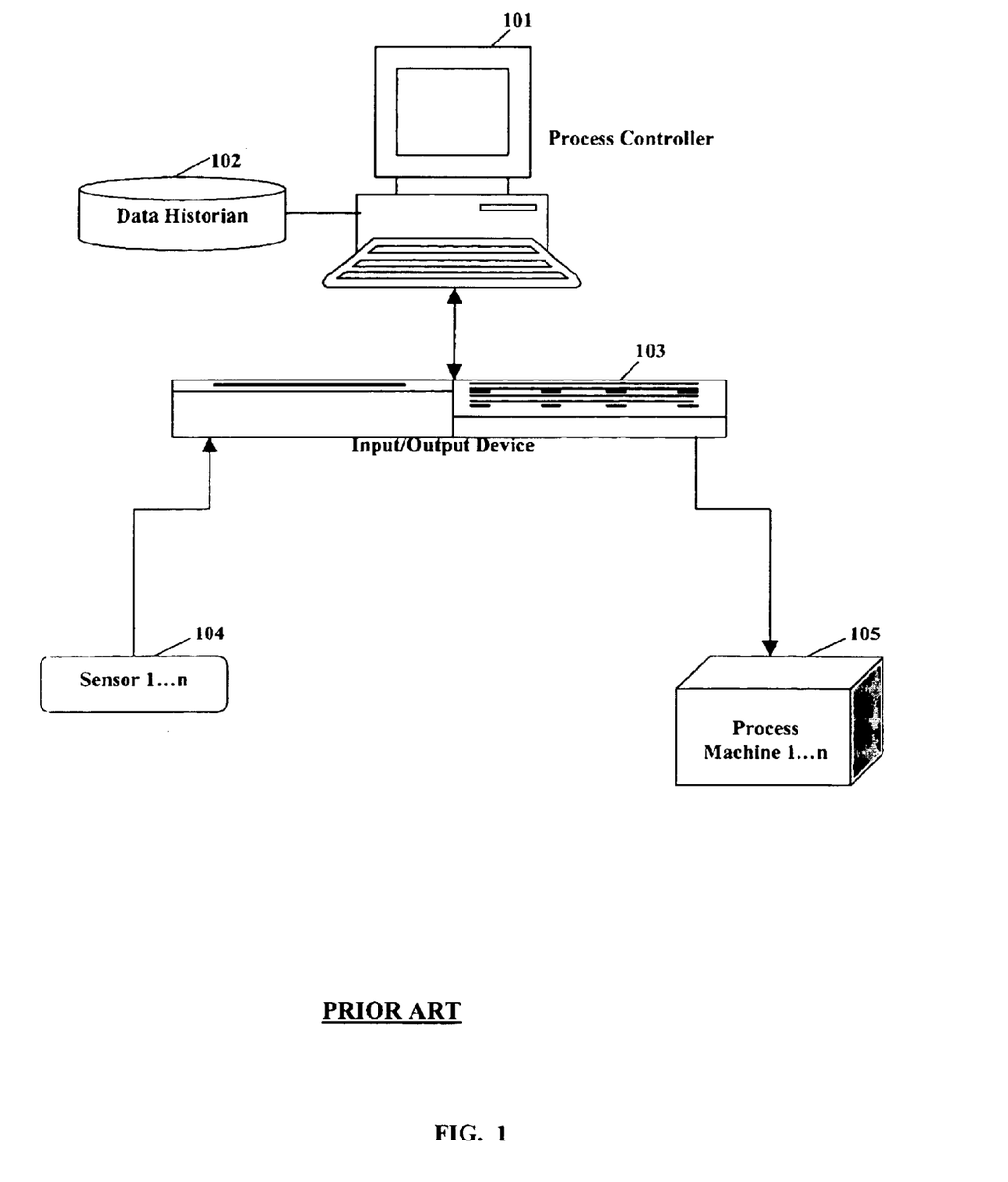
FIG. 1 is a diagram illustrating components of a typical, prior art process control system.

Referring now to the drawings, the present invention is directed to computer-implemented systems and methods for monitoring and controlling a process. A typical control loop for controlling processes is shown in FIG. 1. A typical process control system employs a process controller 101, which receives process attribute information and stores the information in a data historian 102. The process controller 101 receives measurements of a process variable from at least one process sensor or transmitter 104, via an input/output (I/O) device 103 that facilitates communication between the process controller 101 and the sensors 104; and between the process controller and at least one process machine 105, such as a valve or motor. The process controller 101 contains a set point (desired value) for the variable and an algorithm relating the type of process to control actions for the process machines 105.

Figure 2:
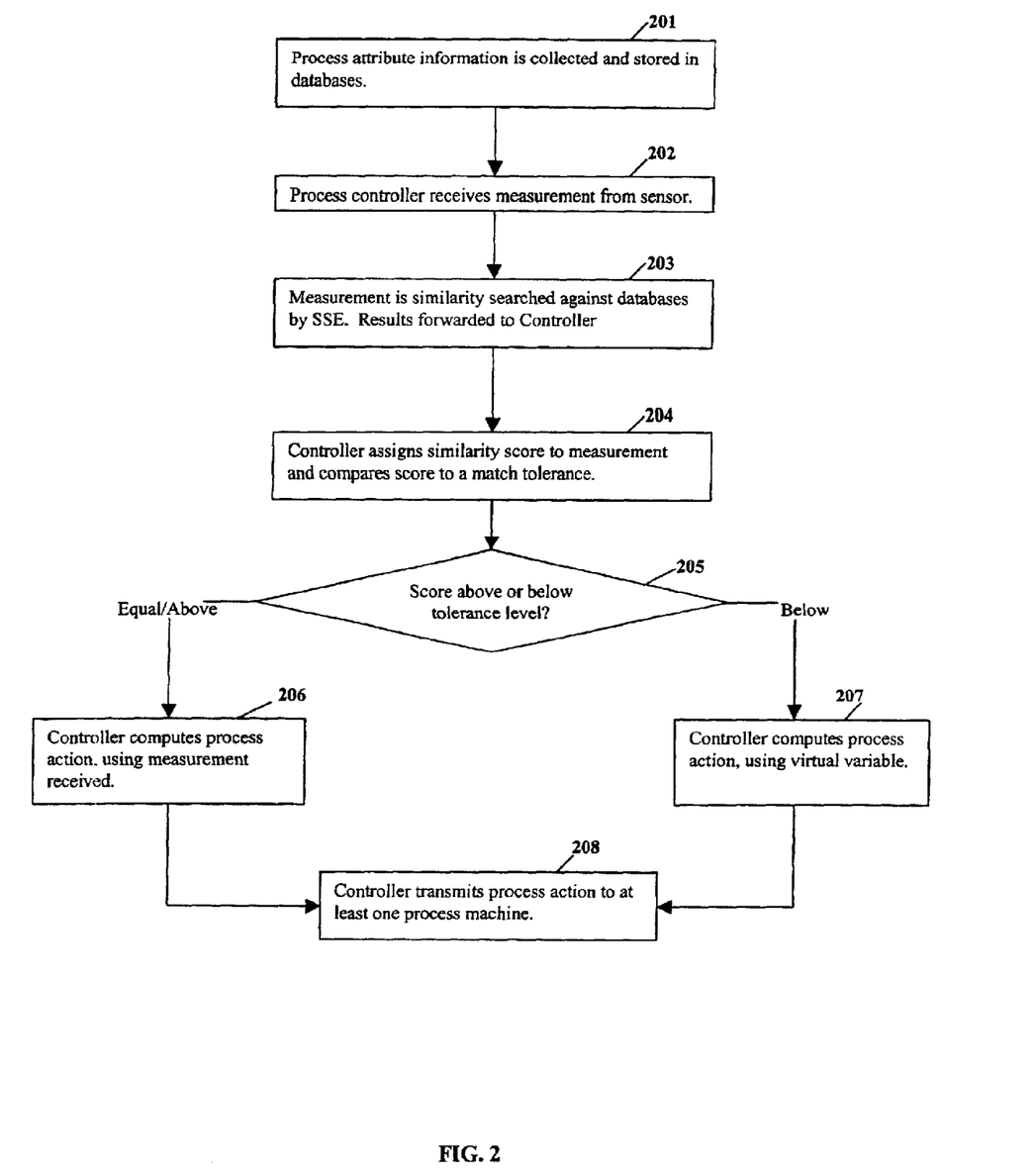
FIG. 2 is a flow diagram illustrating steps of a method for monitoring and controlling a process, using similarity searching, in accordance with one embodiment of the current invention, in which the method is used to identify inaccurate data.

Referring to FIG. 2, a method for monitoring and controlling a process is shown, in accordance with the current invention. In accordance with step 201, process attribute information is collected and stored as objects in a plurality of databases, with which a process controller communicates. The process controller may comprise any computing device suitable for controlling processes within an industrial facility. In one embodiment, the process controller comprises a personal desktop computer. Process attribute information may comprise objects describing the process impact of a process machine. The process attribute objects may comprise information about processes controlled by the process controller, as well as data about the performance and condition of process machines. The information may comprise actual past data received about a process or process machine. The information may also comprise pre-calculated set points for process variables. The databases may comprise at least one data historian, which is stored locally on the process controller. The databases may also comprise databases stored on a computing device with which the process controller communicates, such as a data server.

In accordance with step 202, the process controller receives a measurement of a process variable, from a process sensor. The process controller contains a set point (desired value) for the variable and an algorithm relating the type of process to control actions for at least one process machine. The process sensor may comprise any device suitable for measuring a process variable, such as temperature, pressure, position, motion, direction, rate of change, and the like; and suitable means for communicating the measurement to the process controller. The process sensor may communicate with the process controller directly. In one embodiment, the process sensor communicates with the process controller via an input/output (I/O) device.

In accordance with step 203, the measurement received is similarity searched, against the information in the databases. The similarity searching may be performed by a similarity search engine (SSE) that resides on the process controller. Alternatively, the process controller may communicate with an external SSE that also communicates with the databases in which information is stored. The information against which the measurement is searched may comprise the same process variable or other process variables. For example, where information regarding the exact variable is not available or of sufficient volume, the measurement may be searched against information regarding variables that can be mathematically related to the process variable for which the measurement was received. Results are then forwarded to the process controller.

In accordance with step 204, the process controller assigns a similarity score to the measurement. The similarity score may be calculated by any means suitable for indicating the similarity or dissimilarity of the measurement to the information in the databases, against which the measurement was searched. The means of calculation may be set by a user, and may comprise the use of scientific laws in conjunction with measurements of other variables, to determine an acceptable degree of similarity between the received measurement and the attributes against which it is searched. The similarity score is then compared with a match tolerance level. The match tolerance level may be set by the user, and indicates an acceptable level of similarity between the measurement and the attribute information against which it was searched.

In accordance with step 205, it is determined whether the similarity score meets or exceeds the match tolerance level. Where the similarity score is equal to or above the match tolerance level, then the process controller computes a process action, using the measurement received from the sensor, in accordance with step 206. Where the similarity score is below the match tolerance level, then the process controller may determine that the measurement received is inaccurate. The process controller then computes a process action, using a virtual variable, in accordance with step 207. The virtual variable may comprise a measurement already stored in the databases against which the received measurement was searched. The virtual variable may also comprise a figure calculated mathematically for the process variable involved.

In accordance with step 208, the process controller transmits the process action that it has devised, to the at least one process machine that implements the process action. The at least one process machine may comprise any machine suitable for acting upon a process in an industrial facility and for causing that process to change. Examples of process machines include the family of rotating machines: pumps, compressors, turbines, and blowers. Other examples of process machines include the family of valves: control valves, gate valves, safety relief valves, needle valves, butterfly valves, on-off valves, and plug valves. Other examples of process machines include heat exchangers and motors. The process controller may communicate with the process machine via the I/O device by which the process controller communicates with the sensor from which the measurement was received. Alternatively, the process controller may communicate with the process machine directly, or via a separate I/O device.

Figure 3:
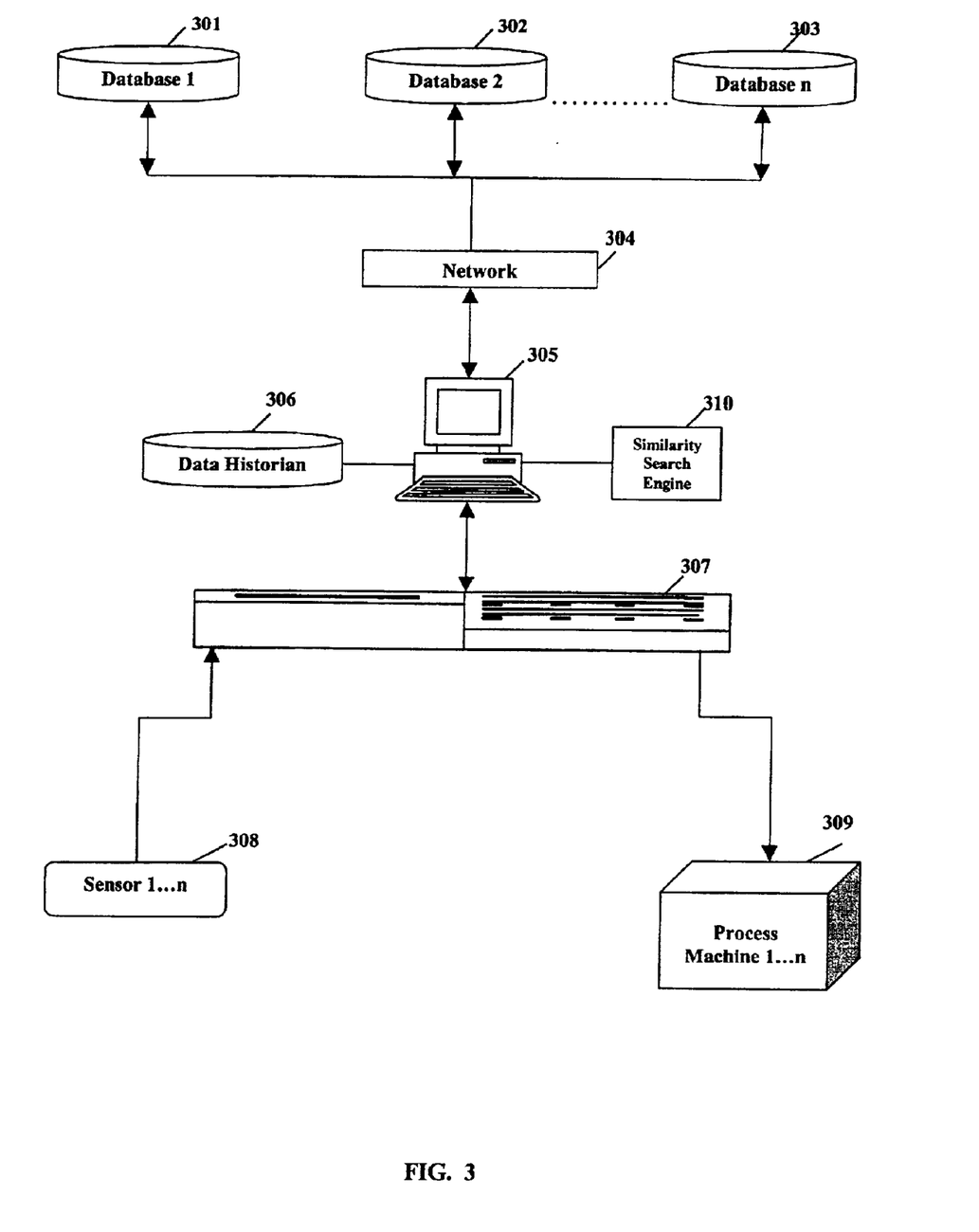
FIG. 3 is a diagram illustrating components of a process control system, in accordance with one embodiment of the current invention, in which multiple disparate databases communicate with each other and with a process controller, over a network.

Referring to FIG. 3, a control loop for controlling processes in accordance with the present invention is shown. Process attribute information is stored in a plurality of disparate databases (1 . . . n), 301–303. The databases may comprise process variable databases, condition monitoring databases, process machine attribute databases, etc. The disparate databases may be stored on a plurality of computing devices, such as data servers, that communicate over a network 304. The network 304 may comprise a local are network, wide are network, or global network such as the Internet. A process controller 305 communicates with the databases 301–303, via the network also. The process controller may also receive process attribute information and store the information in a data historian 306 stored locally on the process controller 305.

The process controller 305 receives measurements of a process variable from at least one process sensor or transmitter 308, via an input/output (I/O) device 307 that facilitates communication between the process controller 305 and the sensors 308. The process controller 305 contains a set point (desired value) for the variable and an algorithm relating the type of process to control actions for at least one process machine. The measurement received is then similarity searched by a similarity search engine (SSE) 310, against the information in the databases 301–303. The search may also include the information in the data historian 306. The information against which the measurement is searched may comprise the same process variable or other process variables. For example, where information regarding the exact variable is not available or of sufficient volume, the measurement may be searched against information regarding variables that can be mathematically related to the process variable for which the measurement was received.

The process controller 305 receives search results from the SSE 310, assigns a similarity score to the measurement searched, and determines whether the similarity score meets or exceeds the match tolerance level. Where the similarity score is equal to or above the match tolerance level, then the process controller 305 computes a process action, using the measurement received from the sensor 308. Where the similarity score is below the match tolerance level, then the process controller 305 computes a process action, using a virtual variable. The virtual variable may comprise a measurement already stored in the databases 301–303 and 306, against which the received measurement was searched. The virtual variable may also comprise a figure calculated mathematically for the process variable involved.

The process controller 305 transmits the process action that it has devised, to one or more process machines (1 . . . n) 309 that implement the process action. The process controller 309 may communicate with the process machine via the I/O device 307, by which the process controller 305 communicates with the sensors 308 from which the measurement was received.

Figure 4:
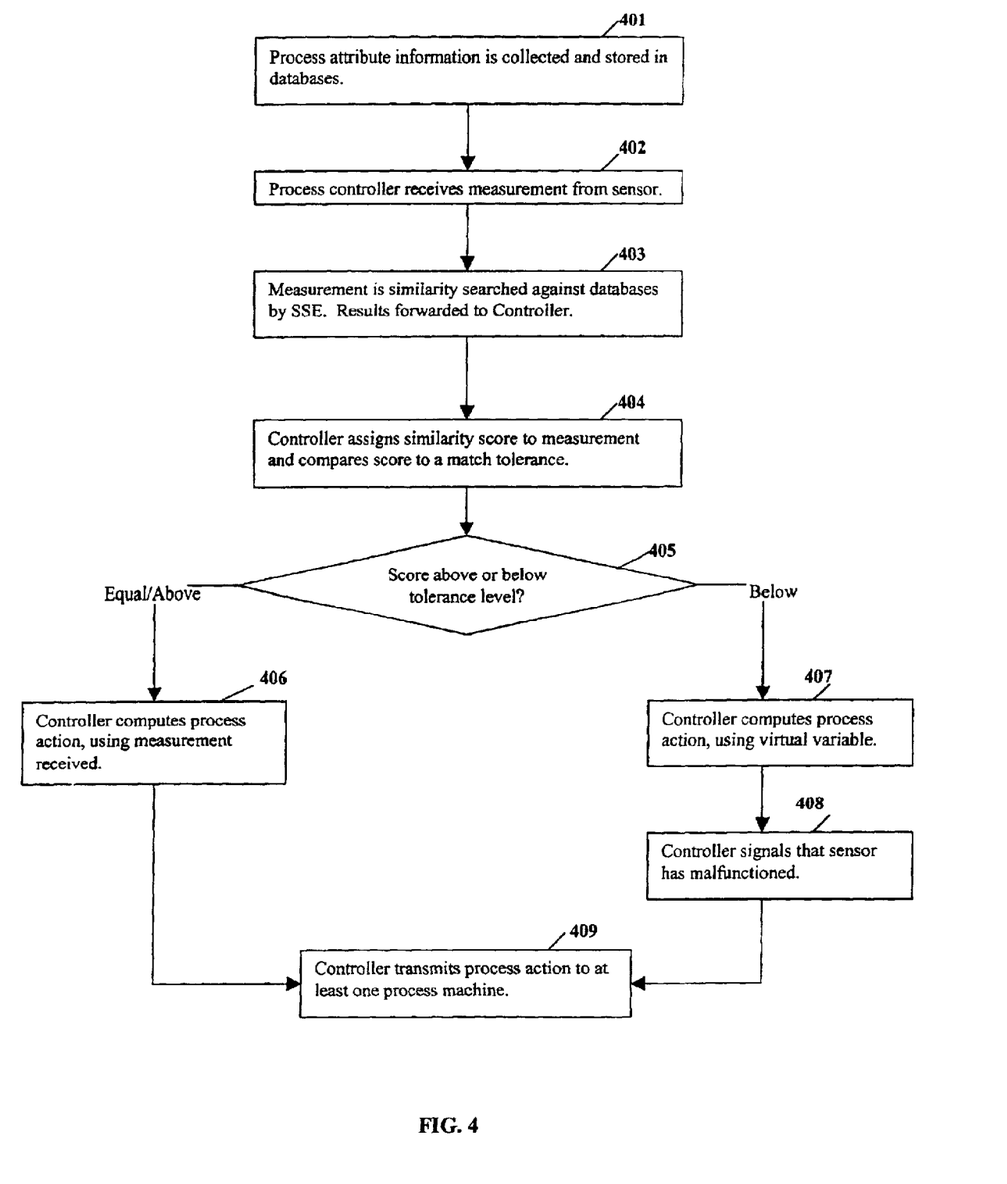
FIG. 4 is a flow diagram illustrating steps of a method for monitoring and controlling a process, using similarity searching, in accordance with one embodiment of the invention, in which the method is used to diagnose sensor malfunction.

Referring to FIG. 4, one embodiment of a method for monitoring and controlling a process is shown, in accordance with the current invention, in which sensor malfunction is detected. In accordance with step 401, process attribute information is collected and stored as objects in a plurality of databases, with which a process controller communicates. The process controller may comprise any computing device suitable for controlling processes within an industrial facility. In one embodiment, the process controller comprises a personal desktop computer. Process attribute information may comprise objects describing the process impact of a process machine. The process attribute objects may comprise information about processes controlled by the process controller, as well as data about the performance and condition of process machines. The information may comprise actual past data received about a process or process machine. The information may also comprise pre-calculated set points for process variables. The databases may comprise at least one data historian, which is stored locally on the process controller. The databases may also comprise databases stored on a computing device with which the process controller communicates, such as a data server.

In accordance with step 402, the process controller receives a measurement of a process variable, from a process sensor. The process controller contains a set point (desired value) for the variable and an algorithm relating the type of process to control actions for at least one process machine. The process sensor may comprise any device suitable for measuring a process variable, such as temperature, pressure, position, motion, direction, rate of change, and the like; and suitable means for communicating the measurement to the process controller. The process sensor may communicate with the process controller directly. In one embodiment, the process sensor communicates with the process controller via an input/output (I/O) device.

In accordance with step 403, the measurement received is similarity searched, against the information in the databases.

The similarity searching may be performed by a similarity search engine (SSE) that resides on the process controller. Alternatively, the process controller may communicate with an external SSE that also communicates with the databases in which information is stored. The information against which the measurement is searched may comprise the same process variable or other process variables. For example, where information regarding the exact variable is not available or of sufficient volume, the measurement may be searched against information regarding variables that can be mathematically related to the process variable for which the measurement was received. Results are then forwarded to the process controller.

In accordance with step 404, the process controller assigns a similarity score to the measurement. The similarity score may be calculated by any means suitable for indicating the similarity or dissimilarity of the measurement to the information in the databases, against which the measurement was searched. The means of calculation may be set by a user, and may comprise the use of scientific laws in conjunction with measurements of other variables, to determine an acceptable degree of similarity between the received measurement and the attributes against which it is searched. The similarity score is then compared with a match tolerance level. The match tolerance level may be set by the user, and indicates an acceptable level of similarity between the measurement and the attribute information against which it was searched.

In accordance with step 405, it is determined whether the similarity score meets or exceeds the match tolerance level. Where the similarity score is equal to or above the match tolerance level, then the process controller computes a process action, using the measurement received from the sensor, in accordance with step 406. Where the similarity score is below the match tolerance level, then the process controller may determine that the sensor from which the measurement was received has malfunctioned. The process controller then computes a process action, using a virtual variable, in accordance with step 407. The virtual variable may comprise a measurement already stored in the databases against which the received measurement was searched. The virtual variable may also comprise a figure calculated mathematically for the process variable involved.

In accordance with step 408, the process controller signals that the sensor that transmitted the measurement received may have malfunctioned. The signal may be sent to any suitable person or device, such as an operator workstation or a portable computing device used by the operator.

In accordance with step 409, the process controller transmits the process action that it has devised, to the at least one process machine that implements the process action. The at least one process machine may comprise any machine suitable for acting upon a process in an industrial facility and for causing that process to change. Examples of process machines include the family of rotating machines: pumps, compressors, turbines, and blowers. Other examples of process machines include the family of valves: control valves, gate valves, safety relief valves, needle valves, butterfly valves, on-off valves, and plug valves. Other examples of process machines include heat exchangers and motors. The process controller may communicate with the process machine via the I/O device by which the process controller communicates with the sensor from which the measurement was received. Alternatively, the process controller may communicate with the process machine directly, or via a separate I/O device.

Figure 5:
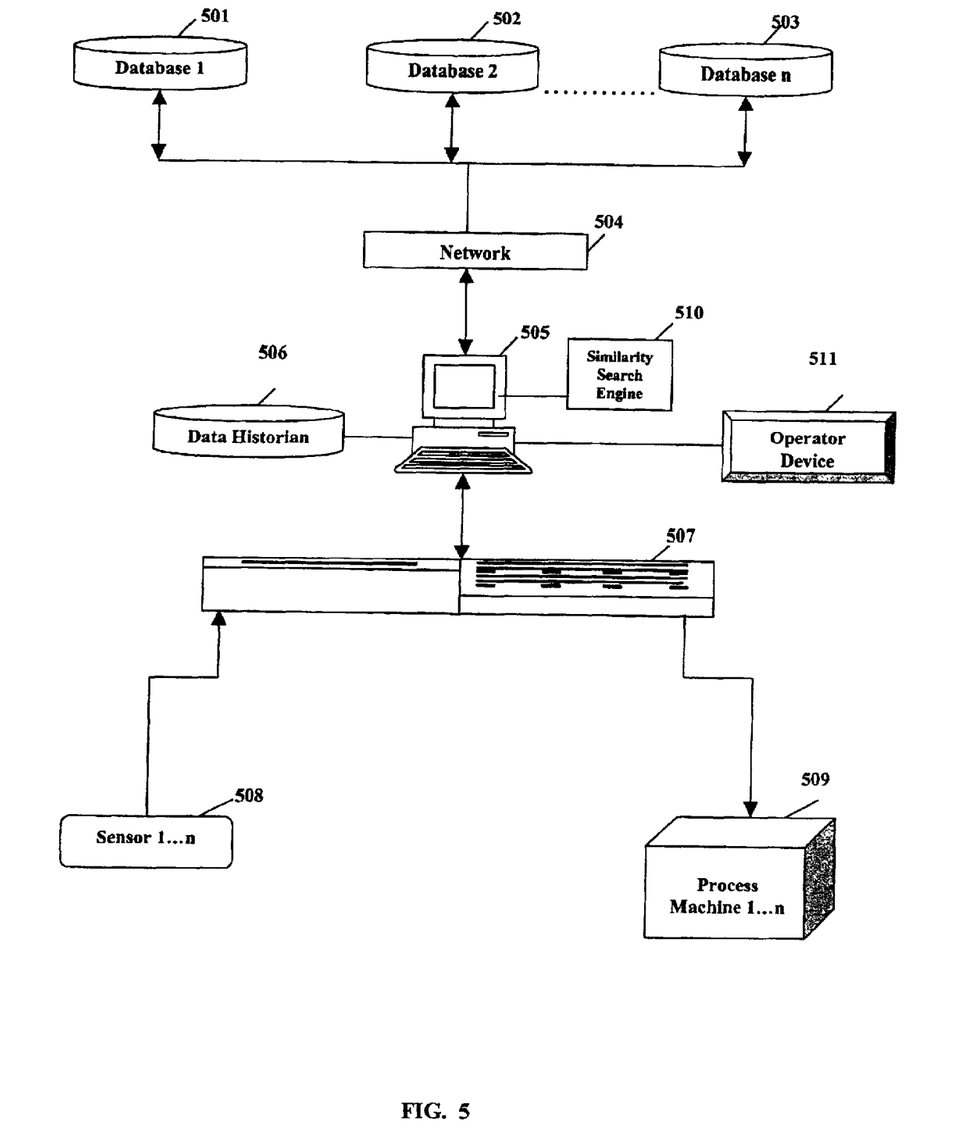
FIG. 5 is a diagram illustrating components of a system for implementing the embodiment of the method shown in FIG. 4.

FIG. 5 shows components of one embodiment of a system for implementing the method described with reference to FIG. 4. Process attribute information is stored in a plurality of disparate databases (1 . . . n), 501–503. The disparate databases may be stored on a plurality of computing devices, such as data servers, that communicate over a network 504. The network 504 may comprise a local area network, wide area network, intranet, Ethernet, or global network such as the Internet. A process controller 505 communicates with the databases 501–503, via the network also. The process controller may also receive process attribute information and store the information in a data historian 506 stored locally on the process controller 505.

The process controller 505 receives measurements of a process variable from at least one process sensor or transmitter 508, via an input/output (I/O) device 507 that facilitates communication between the process controller 505 and the sensors 508. The process controller 505 contains a set point (desired value) for the variable and an algorithm relating the type of process to control actions for at least one process machine. The measurement received is then similarity searched by a similarity search engine (SSE) 510, against the information in the databases 501–503. The search may also include the information in the data historian 506. The information against which the measurement is searched may comprise the same process variable or other process variables. For example, where information regarding the exact variable is not available or of sufficient volume, the measurement may be searched against information regarding variables that can be mathematically related to the process variable for which the measurement was received.

The process controller 505 receives search results from the SSE 510, assigns a similarity score to the measurement searched, and determines whether the similarity score meets or exceeds the match tolerance level. Where the similarity score is equal to or above the match tolerance level, then the process controller 505 computes a process action, using the measurement received from the sensor. Where the similarity score is below the match tolerance level, then the process controller 505 computes a process action, using a virtual variable. The virtual variable may comprise a measurement already stored in the databases 501–503 and 506, against which the received measurement was searched. The virtual variable may also comprise a figure calculated mathematically for the process variable involved.

The process controller 505 signals that the sensor 508 that transmitted the measurement received may have malfunctioned. The signal may be sent to any suitable person or device, such as an operator device 511, which may comprise a workstation or a portable computing device used by the operator.

The process controller 505 transmits the process action that it has devised, to one or more process machines (1 . . . n) 509 that implement the process action. The process controller 505 may communicate with the process machine 509 via the I/O device 507, by which the process controller 505 communicates with the sensors 508 from which the measurement was received.

Figure 6:
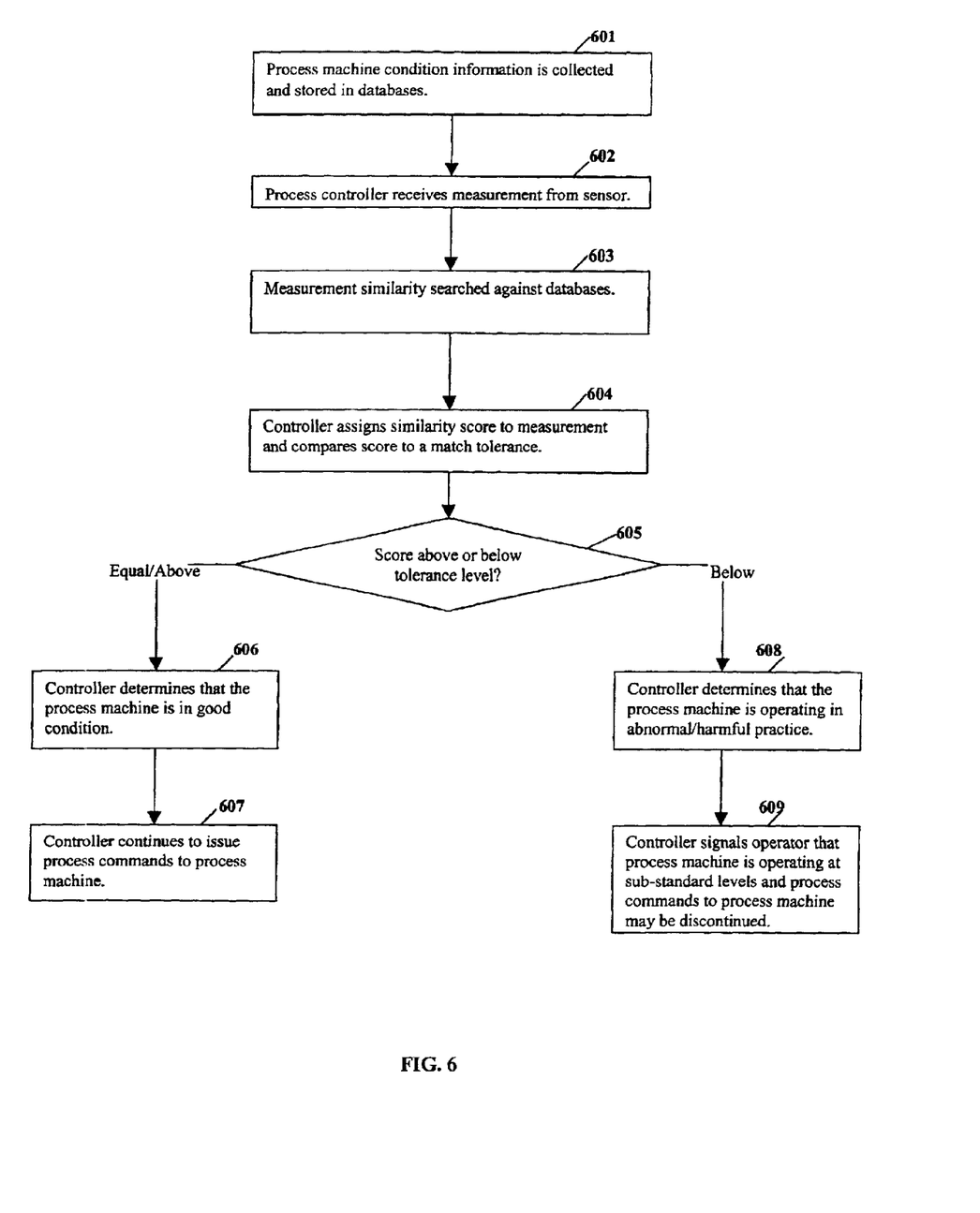
FIG. 6 is a flow diagram illustrating steps of a method for monitoring and controlling a process, using similarity searching, in accordance with one embodiment of the invention, in which the method is used to monitor process machine performance.

FIG. 6 illustrates steps of one embodiment of a method for monitoring and controlling a process, in accordance with the current invention, in which the condition and performance of process machines are monitored. In accordance with step 601, process machine condition and performance information is collected and stored as objects in a plurality of databases, with which a process controller communicates. The process controller may comprise any computing device suitable for controlling processes within an industrial facility. In one embodiment, the process controller comprises a personal desktop computer. Process machine condition and performance information may comprise ay information that provides indications of optimal machine performance and condition ranges. This may include information given by manufacturers upon manufacture or reconditioning of process machinery. The information may also include process machine history information gathered by an operator, showing machine condition and performance during periods of acceptable operation.

Examples of machine performance and condition data may include, for example, head-flow curves for pumps; compressor and turbine performance curves; valve flow characteristics and valve signature curves; heat exchanger efficiency curves; motor torque/speed curves; etc.

The databases may comprise at least one data historian, which is stored locally on the process controller. The databases may also comprise databases stored on a computing device with which the process controller communicates, such as a data server.

In accordance with step 602, the process controller receives a measurement of a process machine monitoring variable, from a process sensor. The process sensor may comprise any device suitable for measuring a process variable, such as temperature, pressure, position, motion, direction, rate of change, and the like; and suitable for communicating the measurement to the process controller. The process sensor may communicate with the process controller directly. In one embodiment, the process sensor communicates with the process controller via an input/output (I/O) device. Process machine monitoring variables may comprise any variables that can be related physically or mathematically to machine condition or performance. Process machine monitoring variables may include, for example, vibration, shaft alignment, bearing temperature, motor current, flux data, etc.

In accordance with step 603, the measurement received is similarity searched, against the information in the databases. The similarity searching may be performed by a similarity search engine (SSE) that resides on the process controller. Alternatively, the process controller may communicate with an external SSE that also communicates with the databases in which information is stored. The information against which the measurement is searched may comprise the same process variable, other process variables, or performance and condition datasets, such as the curves discussed previously. Results are then transmitted to the process controller.

In accordance with step 604, a similarity score is assigned to the measurement searched. The similarity score may be calculated by any means suitable for indicating the similarity or dissimilarity of the measurement to the information in the databases, against which the measurement was searched. The means of calculation may be set by a user, and may comprise the use of scientific laws in conjunction with measurements of other variables, to determine an acceptable degree of similarity between the received measurement and the attributes against which it is searched. The similarity score is then compared with a match tolerance level. The match tolerance level may be set by the user, and indicates an acceptable level of similarity between the measurement and the attribute information against which it was searched.

In accordance with step 605, it is determined whether the similarity score meets or exceeds the match tolerance level. Where the similarity score is equal to or above the match tolerance level, in accordance with step 606, the process controller determines that the process machine is in good condition, i.e., functioning within an acceptable operating range, which may be predetermined by the operator. In accordance with step 607, the process controller then continues to issue process commands to the process machine.

Where the similarity score is below the match tolerance level, in accordance with step 608, then the process controller may determine that the process machine is operating abnormally, or even harmfully to itself or associated process machines. In accordance with step 609, the process controller signals an operator as to the sub-standard operating condition of the process machine. The signal may be sent to any suitable person or device, such as an operator workstation or a portable computing device used by the operator. The process controller may cease issuing process commands to the process machine. Whether the commands are discontinued may be a choice for the operator, or may pre-set, for example, to depend upon on the degree of dissimilarity found in the similarity search results.

Figure 7:
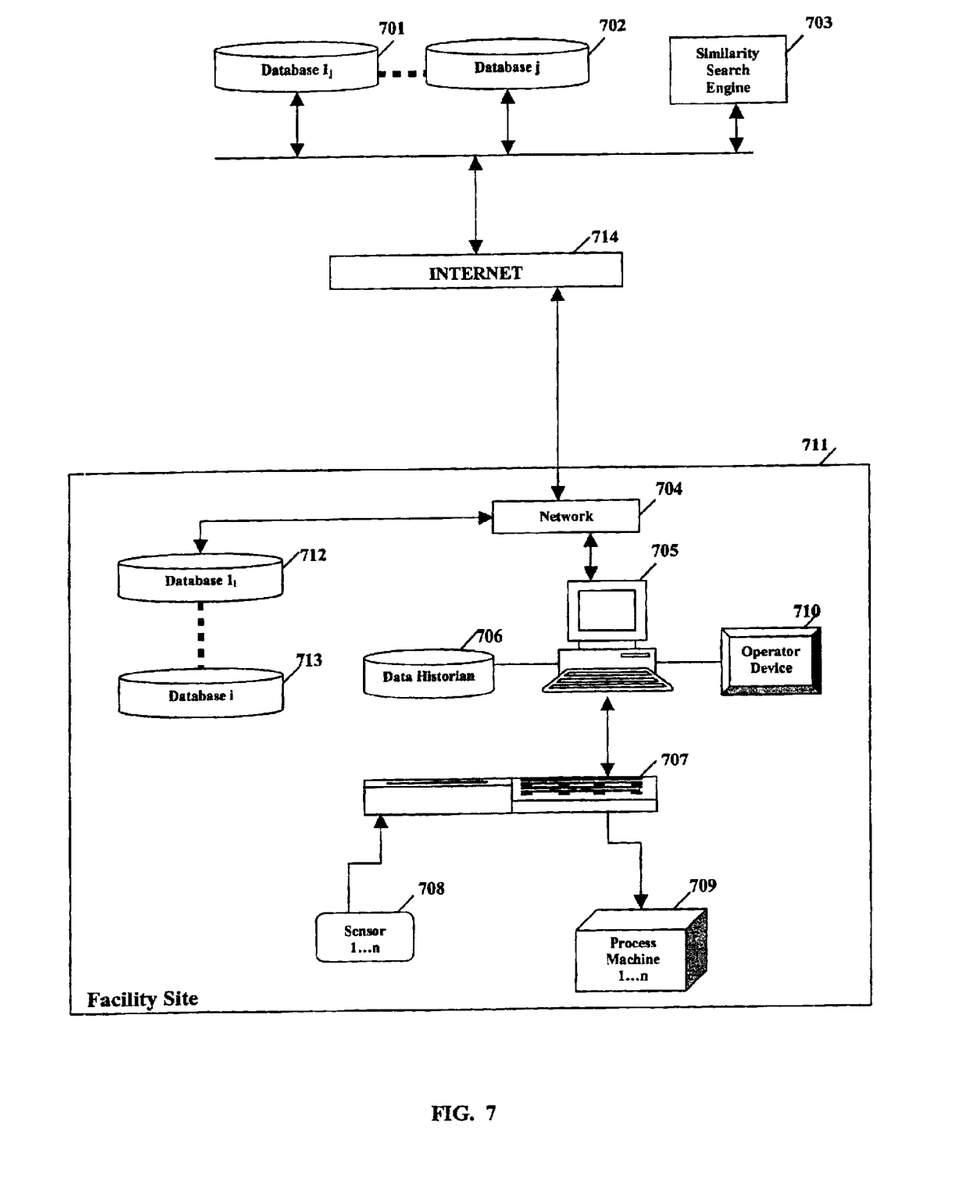
FIG. 7 is a diagram illustrating components of a system for implementing the current invention, in which similarity searching is performed by an off-site similarity search engine, which may communicate with both on-site and off-site databases.

FIG. 7 shows components of an embodiment of a system for implementing the current invention. Process attribute information is stored in a plurality of remote disparate databases ($1_j \ldots j$), 701–702. The remote disparate databases 701–702 may comprise, for example, process machine performance databases, including such databases kept by machine manufacturers. The remote disparate databases 701–702 may also comprise process variable databases, condition monitoring databases, and other databases storing information related to process control. The remote disparate databases 701–702 may be stored on a plurality of computing devices, such as data servers. The remote disparate databases 701–702 communicate with each other, and with a similarity search engine (SSE) 703 via the Internet 714. The SSE 703 is also off-site.

An on-site network 704 is operated at a facility site 711. The on-site network 704 allows a plurality of on-site databases ($1_i \ldots i$), 712–713, to communicate over the Internet 714 with the SSE 703. The on-site databases 712–713 may comprise, for example, process machine performance databases, including such databases kept by machine manufacturers. The on-site databases 712–713 may also comprise process variable databases, condition monitoring databases, and other databases storing information related to process control. The on-site databases may also communicate with a process controller 705 located at the facility site 711 via the on-site network 704. The on-site network 704 may comprise a proprietary network, a local area network, wide area network, intranet, or Ethernet. In one embodiment, the on-site network comprises a 10 or 100 MB Ethernet network based on TCP/IP or UDP/IP. The process controller 705 may also receive process attribute information and store the information in a data historian 706 stored locally on the process controller 705. The process controller 705 communicates with the off-site SSE 703 across the Internet 714, via the on-site network 704.

The process controller 705 receives measurements of a process variable from at least one process sensor or transmitter 708, via an input/output (I/O) device 707 that facilitates communication between the process controller 705 and the sensors 708. The process controller 705 contains a set point (desired value) for the variable and an algorithm relating the type of process to control actions for at least one process machine. The process controller communicates the measurements to the SSE 703. The process controller 705 may process the measurement into a search command or query before communicating it to the SSE 703. The SSE 703 similarity searches the measurement received, against the information in the databases 701–702. The SSE 703 may also similarity search the measurement received, against the information in the databases 712–713.

The information against which the measurement is searched may comprise the same process variable or other process variables. For example, where information regarding the exact variable is not available or of sufficient volume, the measurement may be searched against information regarding variables that can be mathematically related to the process variable for which the measurement was received.

The process controller 705 receives search results from the SSE 703, assigns a similarity score to the measurement, and determines whether the similarity score meets or exceeds the match tolerance level. Where the similarity score is equal to or above the match tolerance level, then the process controller 705 computes a process action, using the measurement received from the sensor 708. Where the similarity score is below the match tolerance level, then the process controller 705 computes a process action, using a virtual variable. The virtual variable may comprise a measurement already stored in the databases 701–702, 712–713, or 706. The virtual variable may also comprise a figure calculated mathematically for the process variable involved.

Where the similarity score falls below the match tolerance level, the process controller 705 may signal an operator. The signal may be sent to any suitable person or device, such as an operator device 710, which may comprise a workstation or a portable computing device used by the operator.

The process controller 705 transmits the process action that it has devised, to one or more process machines (1 . . . n) 709 that implement the process action. The process controller 705 may communicate with the process machine 709 via the I/O device 707, by which the process controller 705 communicates with the sensors 708 from which the measurement was received.

The current invention is also directed to a software program embodied on computer-readable media, incorporating the method of the current invention.

Using the foregoing, the invention may be implemented using standard programming or engineering techniques including computer programming software, firmware, hardware or any combination or subset thereof. Any such resulting program, having a computer readable program code means, may be embodied or provided within one or more computer readable or usable media, thereby making a computer program product, i.e. an article of manufacture, according to the invention. The computer readable media may be, for instance a fixed (hard) drive, disk, diskette, optical disk, magnetic tape, semiconductor memory such as read-only memory (ROM), or any transmitting/receiving medium such as the Internet or other communication network or link. The article of manufacture containing the computer programming code may be made and/or used by executing the code directly from one medium, by copying the code from one medium to another medium, or by transmitting the code over a network.

An apparatus for making, using or selling the invention may be one or more processing systems including, but not limited to, a central processing unit (CPU), memory, storage devices, communication links, communication devices, server, I/O devices, or any sub-components or individual parts of one or more processing systems, including software, firmware, hardware or any combination or subset thereof, which embody the invention as set forth in the claims.

What is claimed is:

1. A method of data mining attributes for monitoring and controlling a process, comprising:
   a. collecting and storing process attribute information in a plurality of databases;
   b. receiving at least one process measurement from a measurement device;
   c. similarity searching the at least one process measurement against the process attribute information stored in the databases;
   d. assigning a similarity score to the process measurement;
   e. comparing the similarity score to a match tolerance level;
   f. computing a process action for at least one process machine via an algorithm having a process variable, comprising:
      i. replacing the process variable in the algorithm with the process measurement where the similarity score is equal to or greater than the match tolerance level;
      ii. replacing the process variable in the algorithm with a set point where the similarity score is lower than the match tolerance level; and
   g. communicating the process action to a process machine.

2. The method of claim 1, wherein the process attribute information comprises at least one data type, chosen from a group consisting of process machine type, process machine performance ranges, process machine conditions, process set points, and past process measurements.

3. The method of claim 1, wherein the at least one databases reside on a process controller.

4. The method of claim 1, wherein the at least one databases communicate with a process controller, via a network.

5. The method of claim 4, wherein the network is chosen from a group consisting of local area networks, wide area networks, global communication networks, intranet, and Ethernet.

6. The method of claim 1, wherein the measurement device further comprises a process sensor.

7. The method of claim 1, wherein the process measurement is received from the measurement device, via an input/output device.

8. The method of claim 1, wherein the step of similarity searching is performed via a similarity search engine.

9. The method of claim 8, wherein the similarity search engine resides on a process controller.

10. The method of claim 8, wherein the similarity search engine communicates with the process controller via a network.

11. The method of claim 10, wherein the network is chosen from a group consisting of local area networks, wide area networks, global communication networks, intranet, and Ethernet.

12. The method of claim 1, wherein the similarity search score is assigned via a process controller.

13. The method of claim 1, wherein the process action is computed via a process controller.

14. The method of claim 1, wherein the process action is communicated via a process controller.

15. A software program embodied on a computer-readable medium incorporating the method of claim 1.

16. The method of claim 1, wherein:
   a. the match tolerance level of the process attribute information comprises numeric representations;
   b. the numeric representations are sorted in descending; and
   c. replacing the process variable in the algorithm with the attribute having the highest numeric representation of match tolerance level.

17. The method of claim 2, wherein the process machine type is selected from the group consisting of rotating machines, heat exchangers, valves, and transmitters.

18. A computer-implemented method for monitoring and controlling a process, comprising:
   a. collecting and storing process attribute information in a plurality of databases;
   b. receiving at least one process measurement from a measurement device onto a process controller via an input/output device;
   c. similarity searching the at least one process measurement against the process attribute information stored in the databases via a similarity search engine;
   d. assigning a similarity score to the process measurement via the process controller;
   e. comparing the similarity score to a match tolerance level;
   f. the process controller computing a process action for at least one process machine via an algorithm having a process variable, comprising:
      i. replacing the process variable in the algorithm with the process measurement where the similarity score is equal to or greater than the match tolerance level;
      ii. replacing the process variable in the algorithm with a set point where the similarity score is lower than the match tolerance level; and
   g. the process controller communicating the process action to a process machine via an input/output device.

19. The method of claim 18, wherein the process attribute information comprises at least one data type, chosen from a group consisting of process machine type, process machine performance ranges, process machine conditions, process set points, and past process measurements.

20. The method of claim 18, wherein the at least one databases reside on the process controller.

21. The method of claim 18, wherein the at least one databases communicate with the process controller, via a network.

22. The method of claim 21, wherein the network is chosen from a group consisting of local area networks, wide area networks, global communication networks, intranet, and Ethernet.

23. The method of claim 18, wherein the measurement device further comprises a process sensor.

24. The method of claim 18, wherein the similarity search engine resides on the process controller.

25. The method of claim 18, wherein the similarity search engine communicates with the process controller via a network.

26. The method of claim 25, wherein the network is chosen from a group consisting of local area networks, wide area networks, global communication networks, intranet, and Ethernet.

27. A software program embodied on a computer-readable medium incorporating the method of claim 18.

28. The method of claim 18, further comprising notifying an operator where the similarity score is lower than the match tolerance level to identify the process variable.

29. The method of claim 19, wherein the process machine type is selected from the group consisting of rotating machines, heat exchangers, valves, and transmitters.

30. The method of claim 18, further comprising predicting failure of a process machine by comparing the similarity score to the match tolerance level of process measurements from the machine.

31. The method of claim 18, further comprising determining a failure mode of a process machine by comparing the similarity score to the match tolerance level of process measurements from the machine.

32. A system for monitoring and controlling a process, comprising:
   a plurality of databases accessible by a process controller for storing process attribute information;
   a an input/output means for receiving a process measurement into the process controller from a measurement device;
   a similarity search engine connected to the process controller for similarity searching the received process measurement against the process attribute information collected and stored in the databases;
   a similarity search score assigned to the process measurement by the process controller;
   the similarity search score compared to a match tolerance level by the process controller;
   a process action computed by the process controller via an algorithm having a process variable if the similarity search score is below the match tolerance level; and
   the input/output means for communicating the process action to a process machine by the process controller.

33. The system of claim 32, further comprising:
   replacing the process variable in the algorithm with the process measurement where the similarity score is equal to or greater than the match tolerance level;
   replacing the process variable in the algorithm with a set point where the similarity score is lower than the match tolerance level; and
   notifying an operator where the similarity score is lower than the match tolerance level.

34. The system of claim 32, further comprising:
   replacing the process variable in the algorithm with the process measurement where the similarity score is equal to or greater than the match tolerance level;
   replacing the process variable in the algorithm with a process attribute having the highest match tolerance level where the similarity score is lower than the match tolerance level; and
   notifying an operator where the similarity score is lower than the match tolerance level.

35. The system of claim 32, further comprising means for numerically representing the process attribute information and means for storing the numeric representations in a predetermined sequence to facilitate similarity searching.

36. A method for identifying an unidentified object having at least one process attribute, comprising:
   collecting information about at least one process attribute of the unidentified object;
   converting the collected attribute information into a language independent format;
   arranging the collected information in language independent format in a predetermined sequence;
   comparing the language independent collected attribute information with information related to a plurality of known objects, wherein the known objects may include a different number and type of attributes than the unidentified object;
   assigning a value to each of the known objects that indicate the degree of similarity each known object has to the unidentified object;
   providing a list of known objects most closely matching the unknown object based on the assigned similarity values; and replacing the attribute of the unidentified object with the known object of highest similarity.

37. A method of data mining objects having attributes for one or more process control loops, comprising:

collecting information about at least one process attribute from a process variable database;

converting the collected attribute information into a language independent format;

arranging the language independent collected information in a predetermined sequence;

comparing the language independent collected attribute information with information related to a plurality of known objects, wherein the known objects may include different numbers and types of attributes than the collected process attribute information;

assigning a similarity value to each of the known objects for indicating the degree of similarity each object has to the collected process variable attribute; and providing a list of the known objects that most closely match the object having the collected attribute based on the similarity value.

38. The method of claim 37, wherein the collected process attribute information relates to a process machine.

39. The method of claim 37, further comprising replacing the objects having collected process attribute information of with the known objects of highest similarity values.

* * * * *